United States Patent [19]

Richey

[11] Patent Number: 5,366,037
[45] Date of Patent: Nov. 22, 1994

[54] POWERED WHEELCHAIR HAVING DRIVE MOTORS INTEGRATED INTO DRIVEN WHEELS

[75] Inventor: Joseph B. Richey, Shaker Heights, Ohio

[73] Assignee: Invacare Corporation, Elyria, Ohio

[21] Appl. No.: 980,469

[22] Filed: Nov. 23, 1992

[51] Int. Cl.⁵ .............................................. B60K 1/02
[52] U.S. Cl. ................................. 180/65.5; 180/65.6; 180/6.5
[58] Field of Search ..................... 180/65.5, 65.6, 907, 180/6.5, 65.1; 297/DIG. 4

[56] References Cited

U.S. PATENT DOCUMENTS

| 1,172,456 | 2/1916 | Hoadley. | |
|---|---|---|---|
| 2,586,273 | 2/1952 | Steven | 180/27 |
| 3,265,147 | 8/1966 | Coordes | 180/44 |
| 3,532,177 | 10/1970 | Herrman | 180/66 |
| 3,613,813 | 10/1971 | Biddle | 180/6.5 |
| 3,730,287 | 5/1973 | Fletcher et al. | 180/6.5 |
| 3,908,776 | 9/1975 | Dudley | 180/65 |
| 3,955,639 | 5/1976 | Cragg | 180/65.5 |
| 4,037,676 | 7/1977 | Ruse | 180/6.5 |
| 4,299,301 | 11/1981 | Janin | 180/6.5 |
| 4,776,415 | 10/1988 | Brice | 180/11 |
| 4,805,711 | 2/1989 | Lautzenhiser | 180/65.1 |
| 4,849,735 | 7/1989 | Kirtley et al. | 340/539 |
| 4,913,258 | 4/1990 | Sakurai et al. | 180/242 |
| 5,186,269 | 2/1993 | Avakian et al. | 180/907 |
| 5,199,520 | 4/1993 | Chen | 180/65.5 |

Primary Examiner—Richard M. Camby
Attorney, Agent, or Firm—Fay, Sharpe, Beall, Fagan, Minnich & McKee

[57] ABSTRACT

Provided is a powered wheelchair having the drive motors mounted to the driven wheels. The wheelchair includes a seat and first and second side frames extending in a parallel relationship to support opposite sides of the seat. First and second driven wheels are rotatably mounted on the first and second side frames through a fixed axle shaft. First and second drive motors are fixedly mounted on the first and second driven wheels, respectively, and are operatively connected by first and second drives to the first and second driven wheels, respectively. Rotation of the first and second drive motors causes rotation of the driven wheels. Control of the motors is provided by a remote control arrangement, the transmitter mounted to one of the side frames and the receiver mounted on the rotatably mounted wheels.

17 Claims, 5 Drawing Sheets

POWERED WHEELCHAIR HAVING DRIVE MOTORS INTEGRATED INTO DRIVEN WHEELS

BACKGROUND OF THE INVENTION

This invention pertains to the art of wheelchairs, and more particularly to powered wheelchairs. The invention is particularly applicable to battery powered wheelchairs, and will be described with particular reference thereto. It will be appreciated that the invention has broader applications and may be advantageously employed in related powered wheelchairs and not restricted to the particular embodiment described.

Present day wheelchair manufacturers employ substantially similar drive mechanisms for battery powered wheelchairs. Specifically, suitable connections are made between the battery and first and second drive motors. The drive motors are generally attached to the frame underneath or immediately behind the seat. They are positioned generally parallel to side frames of the wheelchair. That is, output shafts of the drive motors are disposed substantially parallel to the side frames. The driven wheels of the powered wheelchair are oriented for rotation in planes generally parallel to the side frames, i.e., rotation about axes substantially perpendicular to the side frames.

It has been known to mount the drive motors transversely with respect to the side frames. Such an arrangement greatly restricts, however, the ability to collapse the wheelchair.

A primary reason for the "parallel" mounting of the drive motors (i.e. parallel to the side frames) is the development of powered wheelchairs as evolved from motorizing non-powered, collapsible wheelchairs. The non-powered or manual wheelchairs had developed to a stage in which the folded or collapsible nature was heavily emphasized for transport and storage reasons. Adapting drive motors to these wheelchairs generally restricted the drive motors to a parallel mounting arrangement because of the collapsible nature of the wheelchair. The wheelchair manufacturers became accustomed to this original mounting arrangement and generally have continued to construct powered wheelchairs in a parallel mounting arrangement of the drive motors.

It is believed that another reason for this parallel mounting arrangement of the drive motors is aesthetics. That is, the drive motors may be effectively "hidden" by mounting the motors under the seat in a parallel arrangement with the side frames. Also, in limited situations, this arrangement of the drive motors would still permit partial collapsing of the wheelchair to increase the ease of transportation.

However, maximum collapsing of the wheelchair to improve the ease of transportation is not effectively accomplished by the known methods of mounting the drive motors. The typical powered wheelchair carries a battery. A rigid platform extends between the side frames to support the battery. Therefore, to fully collapse the wheelchair the battery and platform would have to be removed from the wheelchair.

Thus, to improve the collapsible nature of the wheelchair and therefore improve the ease with which powered wheelchairs can be transported, it would be desirable to remove the motors from their normal parallel arrangement and remove the batteries and rigid platform which extends between the side frames.

U.S. Pat. No. 3,908,776 to Dudley discloses an attempt to remove the motors from beneath the wheelchair seat area. Two electric motor units 9 are wholly disposed in the interior of the hub 1 of the rear wheels of the wheelchair. The motor units 9 are positioned to respective opposite sides of the axis of rotation of the wheel. Two driving gearwheels 10 which are rotated by the respective motor units 9 are engagable with an annular plate 8. Thus, gears of the stationary motors located within the wheel hub rotate the rear wheels by engaging the annular plate 8. Dudley further discloses that a battery tray and batteries carried thereby are used, but that they have been omitted in the Figures. Thus, even with the wheel hub mounting of the motors, the batteries of Dudley still are located between the wheels, thereby obstructing maximum collapse of the wheelchair.

SUMMARY OF THE INVENTION

According to the present invention, there is presented a powered wheelchair that overcomes all of the above-referenced problems and others and provides a more efficient and dimensionally more stable arrangement.

According to the present invention, there is provided a powered wheelchair including first and second frames disposed on opposite sides of a seat. First and second driven wheels are rotatably secured to the frames through a fixed axle shaft means, respectively, and are adapted for rotation relative thereto. First and second drive motors are fixedly mounted on the first and second driven wheels and are operatively connected by first and second drive means to the first and second driven wheels. In this arrangement, rotation of the first and second drive means causes rotation of the first and second driven wheels.

According to a more limited aspect of the present invention, the powered wheelchair further includes a remote control transmitter for transmitting signals for use in controlling operation of the first and second drive motors. The transmitter is mounted to at least one of the first and second side frames, whereby a person positioned in the seat can operate the transmitter. First and second remote control receivers receive the transmitted signals. The receiver is mounted on the first and second driven wheels respectively, and is operatively connected to the first and second drive motors.

According to still another aspect of the present invention, the first and second drive motors are powered by first and second battery means, respectively. The first and second battery means are mounted to the first and second driven wheels. The drive motor, battery means, and, receiver mounted to each respective driven wheel are mounted in spaced relationship to provide approximately equivalent balancing weight to each portion of the respective driven wheel.

According to yet another aspect of the present invention, the first and second drive motors are fixedly mounted on the first and second driven wheels and are operatively connected by first and second drive means to the first and second driven wheels. The drive motors are mounted substantially parallel to the first and second driven wheels, whereby first and second output shafts of the respective motors are substantially perpendicular to the first and second driven wheels. The output shafts of the drive motors drive first and second drive gears of the first and second drive means. The first and second drive gears engage first and second fixed gears, respectively. The first and second fixed gears are fixedly connected to the fixed axle shaft means, whereby rotation of the first and second drive motors causes rotation of the first and second driven wheels.

An advantage of the present invention is the provision of driven wheels which are driven by motors mounted on the driven wheels thereby increasing the collapsible range of the powered wheelchair.

Another advantage of the present invention resides in mounting the batteries, used to drive the drive motors, onto the driven wheels thereby further maximizing the collapsible range of the powered wheelchair.

Yet another advantage of the present invention is found in remote control of the driving motors thereby allowing the batteries and driving motors to be fully enclosed within the respective driven wheels.

Still a further advantage of the present invention is the provision of wheel mounted motors such that batteries can be mounted in a fixed manner around the wheel circumference to equally distribute weight around the circumference of the wheel, thereby providing balanced overall driven wheels.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps, a preferred embodiment of which will be described in detail in this specification and illustrated in the accompanying drawings, which form a part hereof and wherein.

DETAILED DESCRIPTION OF THE PREFERRED EMBODIMENTS

Figure 1B:
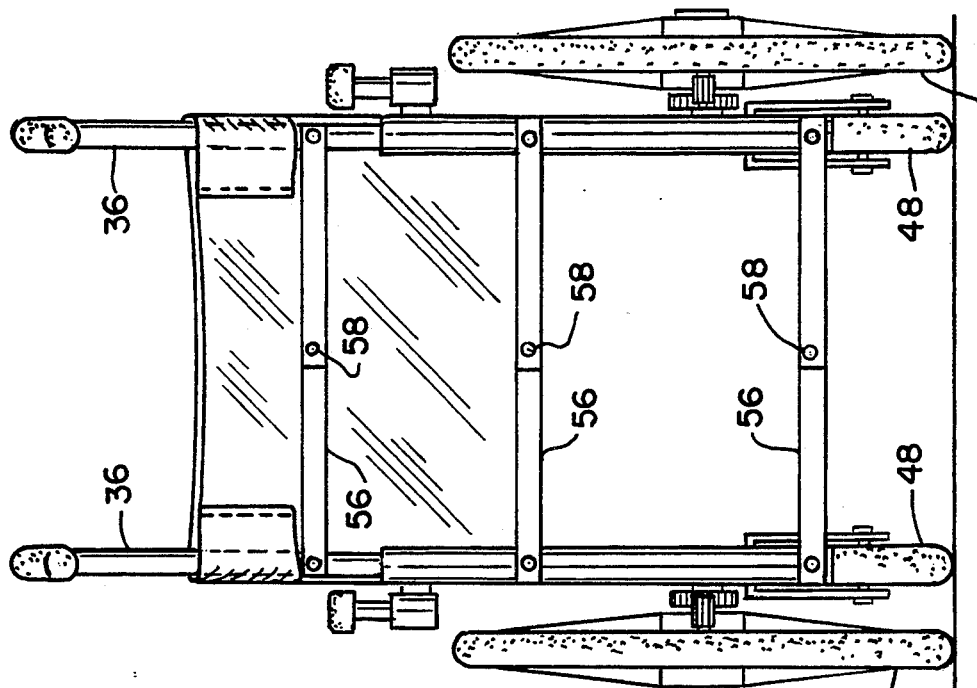
FIGS. 1A and 1B are side and rear perspective views of the subject powered wheelchair.

Referring now to the drawings, wherein the showings are for purposes of illustrating the preferred embodiment of the invention only and not for purposes of limiting same, the FIGURES show a battery powered wheelchair A including a seat assembly B, frame assembly C, a remote control arrangement D, and a driven wheel arrangement E.

Figure 1A:
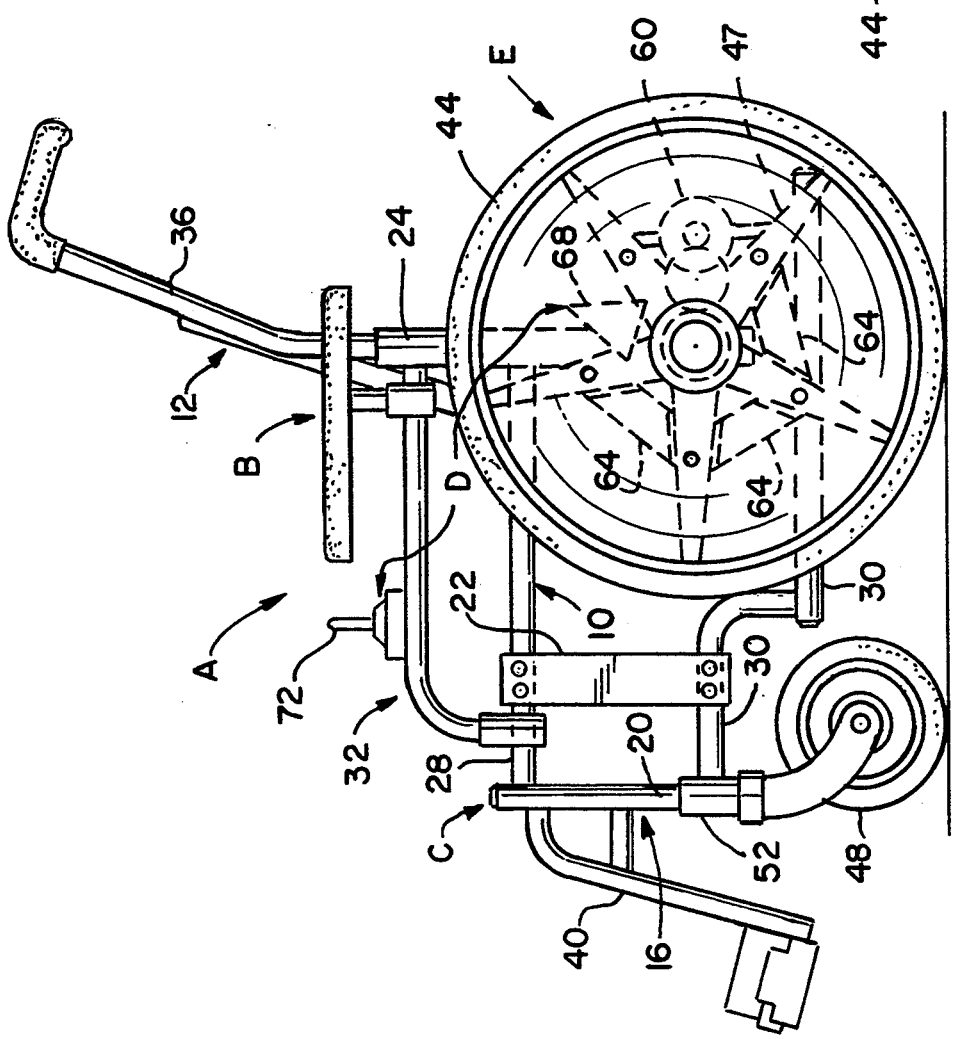

More particularly, as disclosed in FIG. 1A, the powered wheelchair seat assembly B is defined by a first or bottom seat portion 10 and a second or seat back portion 12. The seat assembly is commonly constructed from a padded vinyl material that is secured along peripheral edges of the frame assembly C. Still further, seat inserts may also be utilized with this type of construction to readily conform to the body shape of a particular user.

The frame assembly C is defined by a pair of side frames 16. The side frames are substantially identical in construction so that description of one is equally applicable for the other unless specifically noted otherwise. For example and with reference to side frame 16, first, second, and third vertical frame members 20, 22, 24 are secured in spaced relation by first and second horizontal members 28, 30. A cross-brace frame structure (See FIG. 1B) is disposed to maintain the first and second side frame assemblies 16 in spaced, generally parallel relationship. Support members 32 are received on the side frame assemblies. Extending upwardly from the third vertical member 24 are rear canes 36 that facilitate manual movement of the wheelchair.

The frame assembly is preferably formed from tubular members that are welded or otherwise secured together. The frame arrangement provides a lightweight yet durable arrangement that readily receives additional components thereon for adapting the wheelchair to specialized needs of a particular user.

A footrest assembly 40 may also be secured to the first vertical member of each side frame. Since footrest assemblies of this type are commonly known and do not form a specific part of the subject invention, further discussion is deemed unnecessary.

First and second driven rear wheels 44 are secured to the side frames 16 in a manner that facilitates rotation. Conventional bearing assemblies provide for ease of rotation of each wheel 44 relative to its respective side frame. Disposed forwardly from the first and second driven wheels are a pair of caster wheels 48 of substantially smaller diameter. The small diameter caster wheels are secured to respective side frames through swivel mountings 52 which permit rotation through 360°. The small diameter caster wheels easily pivot in response to the drive torque applied to the driven wheels.

Mounted to spokes 47 of the driven wheels 44 are the drive motors 60, batteries 64, and RF receiver/motor control modules 68. The RF receiver portion of modules 68 receives signals from an RF transmitter of a controller located on one of the side frames 16 at a position wherein a person positioned in seat portion 10 can operate the controller 72.

The operation of radio receivers and transmitters is well-known and need not be explained in detail here. Briefly, an antenna which picks up the radio waves from the transmitter is coupled to the input of an RF amplifier in the receiver. The output of the RF amplifier is applied to an electronic component called a mixer which is also connected to an oscillator. The mixer then "mixes" the RF signal from the RF amplifier with the oscillating signal from the oscillator to produce an output signal of a lower intermediate frequency. This lower intermediate frequency signal is then fed to an intermediate frequency amplifier, and that amplified signal is then applied to an electronic component known as a discriminator which in turn produces an output voltage that is then fed to a relay, to energize an operatively connected device such as a motor controller. In this manner, an attached motor control circuit then functions in response to signals transmitted by the transmitter to the receiver.

As shown in FIG. 1B, cross bars 56 of the cross-brace frame structure interconnect side frames 16 in a parallel spaced relationship. The cross bars 56 are collapsible, having a hinge 58 included therein. Collapsing of hinge 58 facilitates collapsing the entire wheelchair for transportation or storage.

Figure 2A:
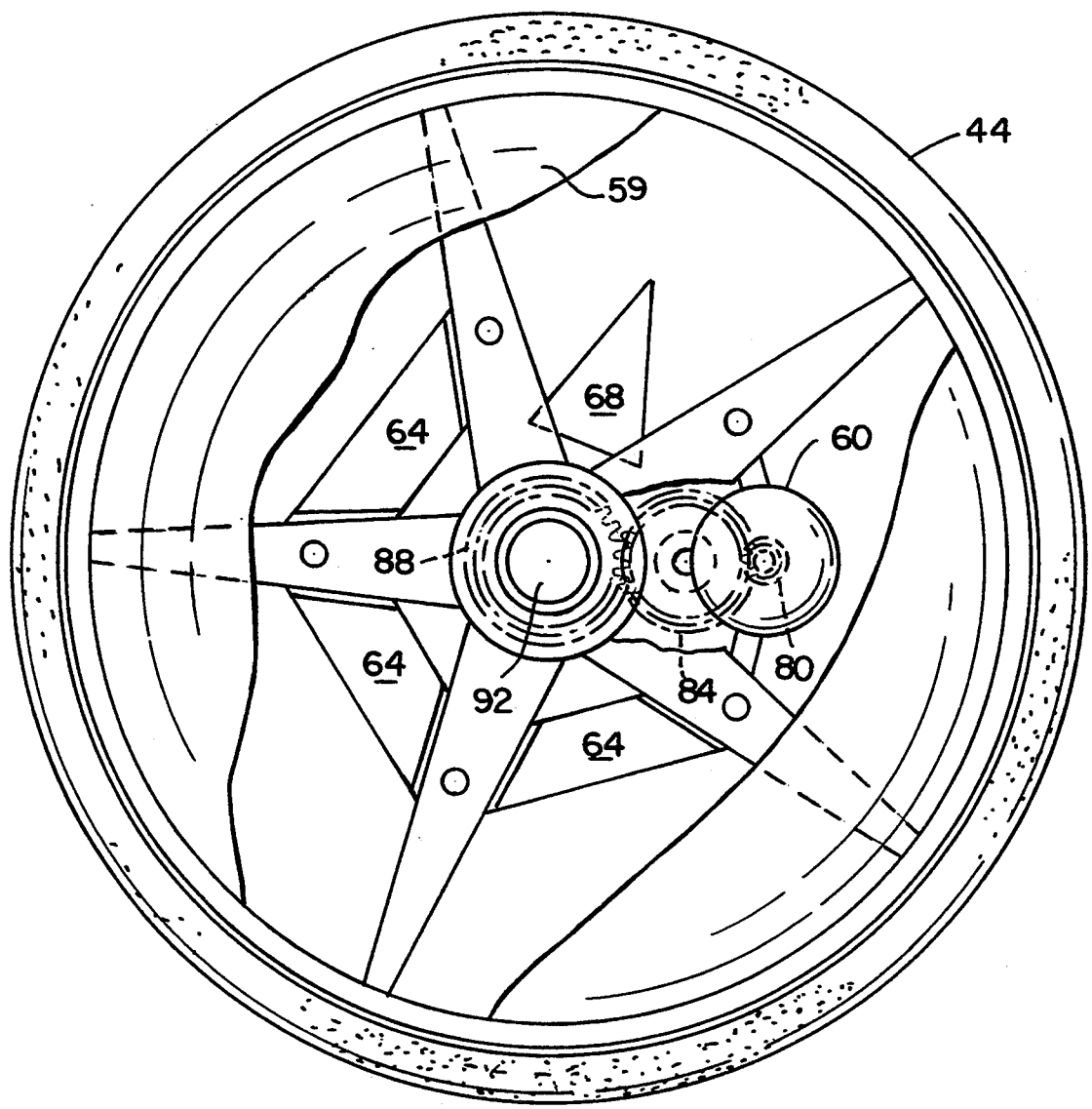
FIGS. 2A and 2B are front and side perspective views of a single wheel of the wheelchair of the present invention.
Figure 2B:
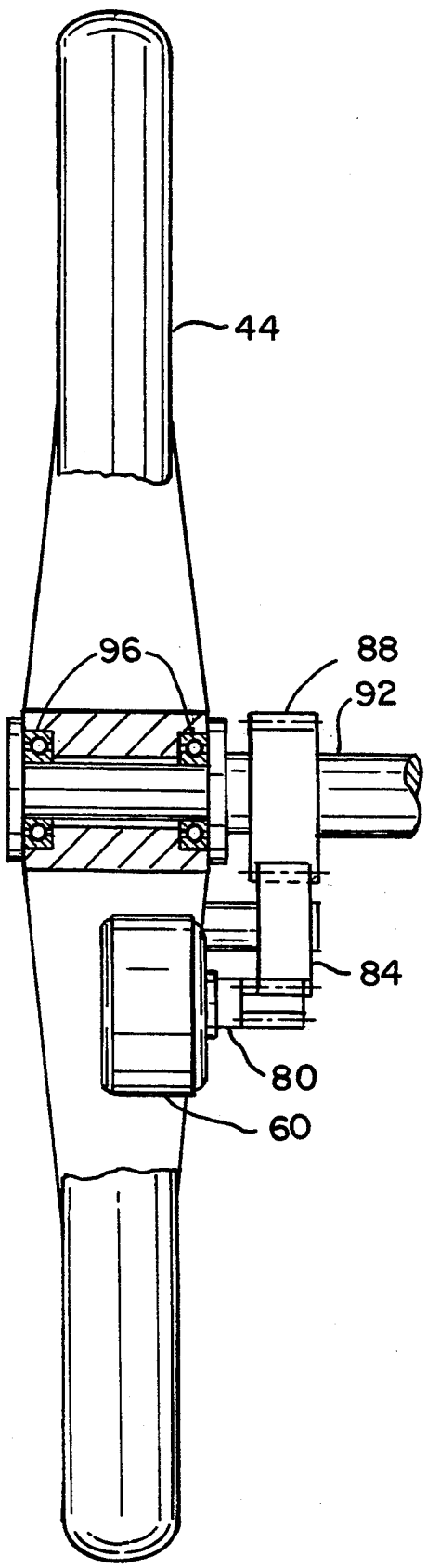

With attention to FIGS. 2A and 2B, a more detailed description of the operation of the driven wheels 44 will be had. It is to be appreciated that the description set forth in the following Figures is appropriate for both first and second driven wheels 44. As shown in FIG. 2A, three similarly constructed batteries 64 are positioned in spaced relationship to each other along with the drive motor 60 and RF receiver/control module 68 such that the weight of these devices are evenly distributed throughout the circumference of the driven wheels 44. The drive motors may be "pancake" type motors in a preferred embodiment. Such motors have a relatively thin cross-section or profile. It is to be appreciated however, that other motors may be successfully implemented in the present invention.

While in the embodiment of FIG. 1A, the drive motors 60 are mounted to the spokes 47 of the driven wheels 44, it is to be appreciated that other attachment arrangements are possible. In particular, as shown in FIG. 2A, the driven wheels 44 have wheel covers 59, and, if the wheel covers are fixedly attached to the wheels the drive motors 60 can be attached to such wheel covers This is also true for the batteries 64 and RF receiver/control modules 68 which are also integrated into the wheels. With continuing attention to FIG. 2A, the output shaft 80 of the drive motor 60 engages rotatable drive gear 84. The rotatable drive gear 84 then engages fixed gear 88. The fixed gear is attached to fixed axle shaft 92. This arrangement causes the rotatable drive gear 84 to rotate around the fixed gear 88 in a planetary fashion when the output shaft 80 of the drive motor 60 is rotating, thus rotating the driven wheel 44. This type of rotation can be accomplished by use of a planetary gear box. As the drive gear rotates around the fixed gear, the drive motor 60 which is mounted on spokes 47 or wheel covers 59 of the driven wheel is rotated in a circumferential path causing rotation of the driven wheel 44.

Another view of the above-discussed arrangement is set forth in FIG. 2B. As is more clearly shown in this Figure, each driven wheel 44 is rotatably attached to the fixed axle shaft 92 through the use of bearings 96 allowing the driven wheel 44 to rotate around the fixed shaft 92. As is also more clearly shown in this Figure, the drive motor is fixedly mounted substantially parallel to the driven wheel 44 such that the output shaft 80 is substantially perpendicular to the driven wheel 44. The output shaft of the drive motor drives the drive Gear 84. The drive gear engages the fixed gear 88 which is fixedly connected to the stationary axle shaft 92. Again, in this arrangement the drive gear 84 rotates around the fixed gear 88 which causes rotation of the driven wheel 44.

Figure 2C:
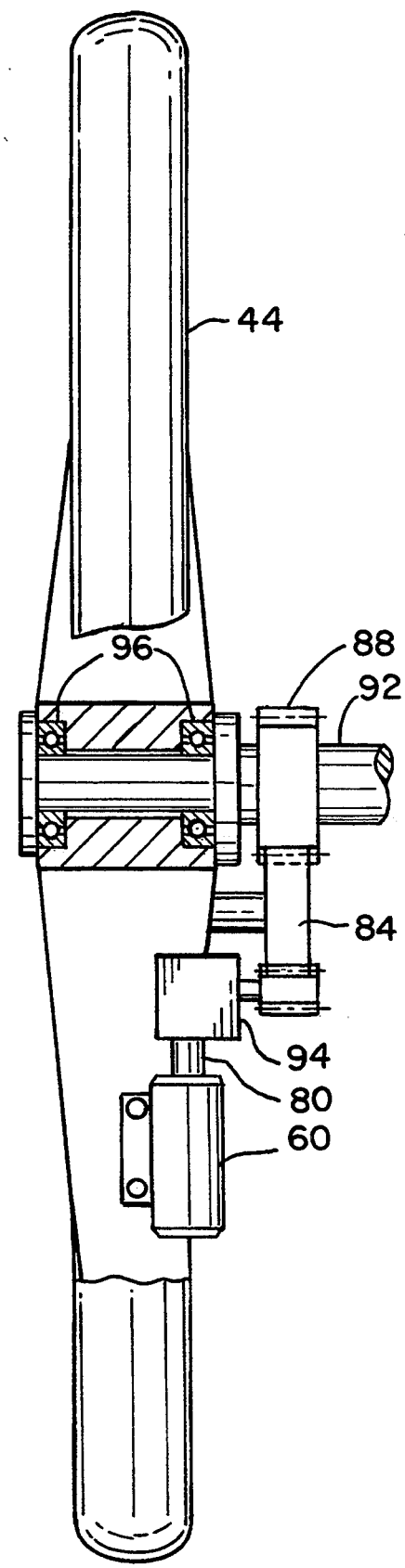
FIG. 2C is a side perspective view of a single wheel of the wheelchair of the present invention, in an alternative embodiment.

As shown in FIG. 2C another embodiment of the present invention includes attaching each drive motor 60 such that the drive shaft 80 is perpendicular to the fixed axle shaft 92. In this embodiment to translate rotation of the drive shaft 80 to the fixed axle shaft 92, a right angle gear box 94 is interposed into the gearing arrangement as shown in FIG. 2C. It is to be appreciated that while FIGS. 2B and 2C show the motors 60 mounted such that they extend outside of the profile of the driven wheels 44, they can be mounted entirely within the driven wheel profile.

Figure 2D:
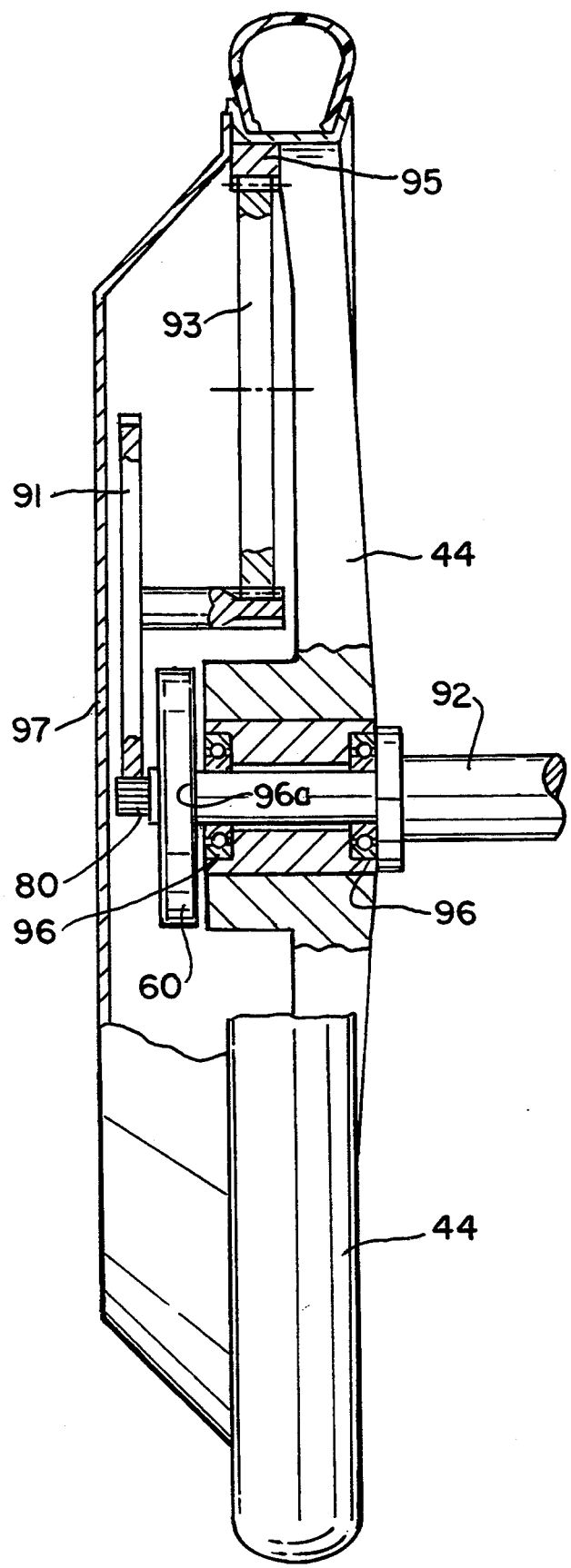
FIG. 2D is a side perspective view of a single wheel of the wheelchair of the present invention, in another alternative embodiment; and, FIG. 3 is a block diagram for the control arrangement of the present invention.

FIG. 2D shows a still further embodiment of the present invention which implements a planetary gearing arrangement. Fixed shaft 92 extends through the wheel 44 having its outwardly extending end 92a attached to drive motor 60, such that output shaft 80 is substantially perpendicular to the driven wheel 44. The output shaft 80 of drive motor 60 drives intermediate gear 91 and in turn, the drive gear 93. The drive gear 93 engages wheel gear 95 which is fixed to the interior rim of the wheel 44. In this arrangement, the drive motor remains stationary with the driven gears rotating around the drive motor in a planetary fashion. Wheel cap 97 can be attached to the wheel 44.

It is to be appreciated that it would be possible to pass the fixed shaft 92 only partially through the wheel 44 and attach a properly sized drive motor 60, intermediate gears 91, and drive gears 93, such that they do not extend outside of the outer profile of the wheel 44. It is further to be appreciated that in this embodiment, the batteries 64 might also be attached to the fixed shaft 92 or placed on to the wheel 44 and connected to the drive motor through a slip ring type arrangement.

Using the above disclosed arrangements, incorporating the drive and control means into the driven wheels, there is no footprint of the drive motors, batteries, or controller between the driven wheels of the wheelchair. This, therefore, allows for a maximum collapsing of the wheelchair.

Figure 3:
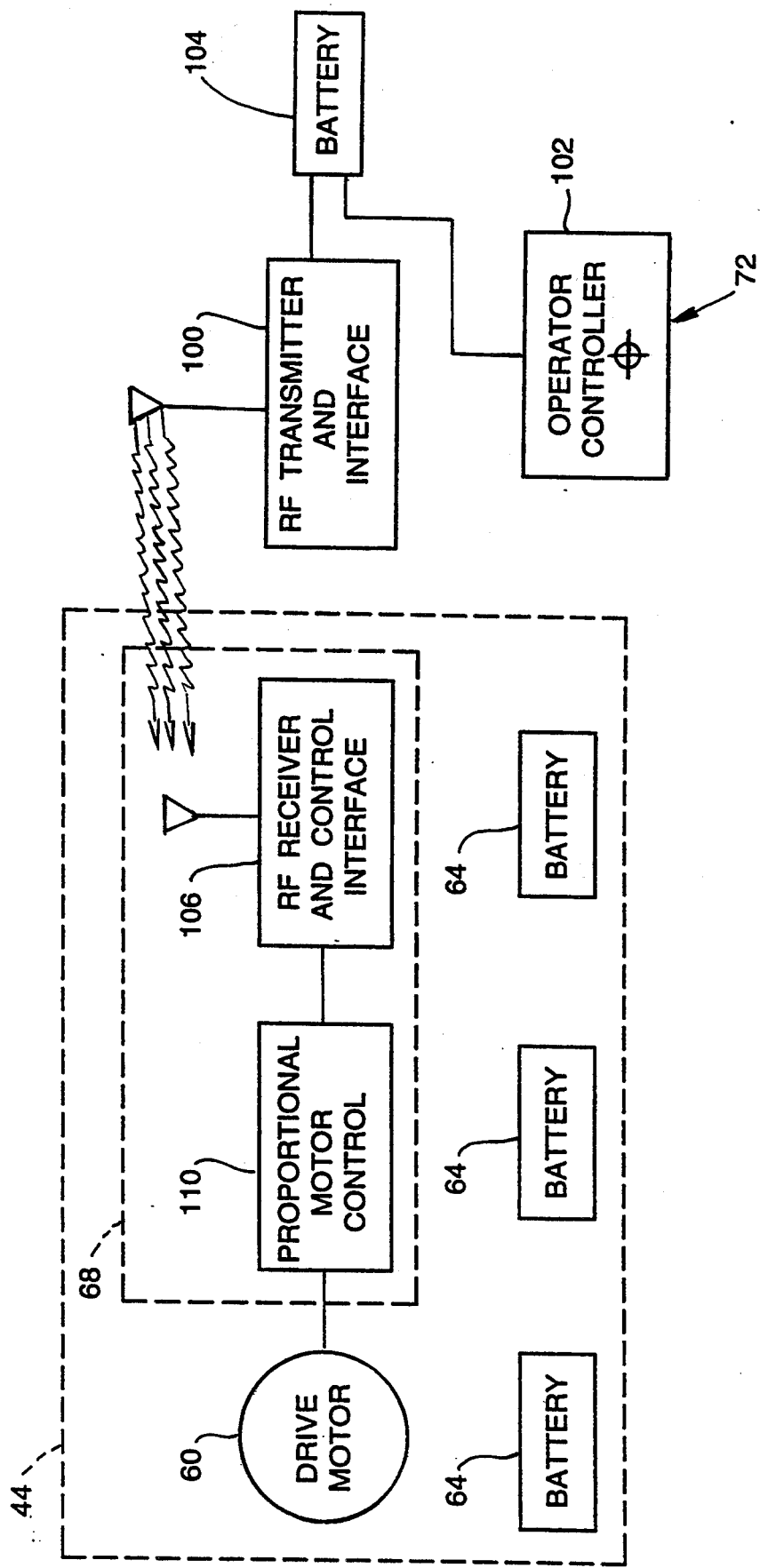

With attention to FIG. 3, a block diagram is detailed setting forth the use of RF controlled transmitters and receivers. The controller 72 includes RF transmitter 100 and joystick 102. The joystick is operable by a person positioned within the wheelchair. The controller 72 is powered by battery 104. Operation of the joystick provides output signals to be transmitted by the RF transmitter 100. The output signals are received by the RF receiver/motor control modules 68. The modules include RF receiver and control interface circuitry 106 and proportional motor controllers 110. The RF receivers and proportional motor controllers along with the driven motors 60 are powered by batteries 64.

As is well-known, regulating the power supply to right and left drive motors controls the output torque for driving the wheels. If equal power is supplied to the drive motors, the wheelchair will move forwardly and rearwardly, generally in a straight path. Reducing the power to a selected motor causes the wheelchair to turn. The motors may also be selectively driven in reverse to facilitate turning, if desired. The electronics in the proportional motor controllers 110 are considered well-known in the art so that further discussion is deemed unnecessary to a full and complete understanding of the subject invention.

Though the present wheelchair is a motorized wheelchair, it is to be appreciated that the wheelchair may be manually moved both forwardly and rearwardly even though the drive mechanism is fully engaged. As is conventionally known, clutch mechanisms may be incorporated adjacent the drive gears to selectively engage and disengage the drive mechanisms from the rotary output of the drive motors. Any number of clutch arrangements could be utilized within the scope of the present invention.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A powered wheelchair comprising:

a seat;

first and second side frames extending in spaced, generally parallel relationship and supporting opposite sides of the seat;

first and second driven wheels rotatably mounted on the first and second side frames through a fixed axle shaft means, respectively, and adapted for rotation relative thereto; and first and second drive motors fixedly mounted on the first and second driven wheels, respectively, operatively connected by first and second drive means to the first and second driven wheels, respectively, whereby operation of the first and second drive motors causes rotation of the first and second driven wheels, which in turn causes the first and second motors to be rotated in a circumferential path defined first and second driven wheels.

2. The powered wheelchair according to claim 1 further comprising:

remote control transmitting means for transmitting signals for use in controlling operation of the first and second drive motors, the transmitting means mounted to at least one of the first and second side frames, whereby a person located in the seat can operate the transmitting means; and, first and second remote control receiving means for receiving the transmitted signals, the receiving means mounted on the first and second wheels, respectively, and operatively connected to the first and second drive motors, respectively.

3. The powered wheelchair according to claim 2 wherein the interiors of each of the first and second driven wheels are enclosed, whereby the mounted first and second drive motors are enclosed.

4. The powered wheelchair according to claim 2 wherein each of the first and second drive motors are powered by first and second battery means, respectively, the first and second battery means mounted to the first and second driven wheels, respectively.

5. The powered wheelchair according to claim 4 wherein the first drive motor, battery means, and receiver means are mounted on the first driven wheel in spaced relationship to provide approximately equivalent weight to each portion of the first driven wheel.

6. The powered wheelchair according to claim 1 wherein the first and second drive motors are pancake type motors having a low profile.

7. The powered wheelchair according to claim 1 wherein the first and second drive motors are mounted to spokes extending radially from a hub of the first and second driven wheels, respectively.

8. The powered wheelchair according to claim 1 wherein the first and second drive motors are mounted to wheel covers fixedly attached to the driven wheels.

9. A powered wheelchair comprising:

a seat;

first and second side frames extending in spaced, generally parallel relationship and supporting opposite sides of the seat;

first and second driven wheels rotatably mounted on the first and second side frames through a fixed axle shaft means, respectively, and adapted for rotation relative thereto; and first and second drive motors fixedly mounted on the driven wheels, respectively, and operatively connected by first and second drive means to the first and second driven wheels respectively, the first and second drive motors mounted substantially parallel to the first and second driven wheels, whereby first and second output shafts of the respective motors are substantially perpendicular to the first and second driven wheels, the output shafts of the drive motors driving first and second drive gears of the first and second drive means, the first and second drive gears engaging first and second fixed gears, respectively, the first and second fixed gears fixedly connected to the fixed axle shaft means, whereby operation of the first and second drive motors causes rotation of the first and second driven wheels, which in turn causes the first and second drive motors to rotate in a circumferential path defined by the first and second driven wheels.

10. The powered wheelchair according to claim 9 further including a remote control means for remotely controlling operation of the drive motors.

11. The powered wheelchair according to claim 9 wherein the first and second drive motors are mounted to the fixed axle shaft means, whereby rotation of the first and second drive motors causes planetary rotation of the first and second drive gears in relation to the first and second drive motors.

12. A remote controlled powered wheelchair comprising:

a seat;

first and second side frames extending in spaced, generally parallel relationship and supporting opposite sides of the seat;

first and second driven wheels rotatably mounted on the first and second side frames through a fixed axle shaft means, respectively, and adapted for rotation relative thereto;

first and second drive motors fixedly mounted on the driven wheels, respectively, and operatively connected by first and second drive means to the first and second driven wheels respectively, the first and second drive motors mounted substantially parallel to the first and second driven wheels, whereby first and second output shafts of the respective motors are substantially perpendicular to the first and second driven wheels, the output shafts of the drive motors driving first and second drive gears of the first and second drive means, the first and second drive gears engaging first and second fixed gears, respectively, the first and second fixed gears fixedly connected to the fixed axle shaft means, whereby rotation of the first and second drive motors causes rotation of the first and second driven wheels;

first and second motor control means respectively mounted to the first and second driven wheels and operatively connected to the first and second drive motors, respectively, whereby operation of the first and second motors are controlled;

first and second remote control receiver means mounted to the first and second driven wheels, respectively, and operatively connected to the first and second motor control means, respectively; and, a remote control transmitter means mounted to at least one of the first and second side frames so as to be operable by a person located in the seat, whereby signals from the remote control transmitter are received by the first and second remote control receiver means.

13. The remote controlled powered wheelchair according to claim 12 wherein the interiors of each of the first and second driven wheels are enclosed, whereby the mounted first and second drive motors are enclosed.

14. The remote controlled powered wheelchair according to claim 12 further including hinged crossbraces whereby disengagement of the hinged crossbraces allows collapsing of the wheelchair.

15. The remote controlled powered wheelchair according to claim 12 wherein the first and second output shafts of the first and second drive motors are substantially perpendicular to the fixed axle shaft means.

16. A method of operating a remote controlled powered wheelchair comprising the steps of:
   transmitting signals from a remote control transmitter means mounted to a frame of the wheelchair in a location, whereby the remote control transmitter means is operable by a person located in the wheelchair;
   receiving the transmitted signals by first and second remote control receiver means, respectively, mounted on first and second driven wheels, the driven wheels rotatably mounted on said frame through a fixed axle shaft means;
   adjusting outputs of first and second motor control means based on the received signals, the first and second motor control means mounted on the first and second driven wheels, respectively, and operatively connected to the signal receiving means;
   operating first and second drive motors according to the outputs of the first and second motor control means, the first and second drive motors connected to the first and second drive wheels;
   driving first and second drive gears with output shafts of the first and second drive motors, respectively; and
   engaging first and second fixed gears with the driven first and second drive gears, the fixed gears fixed to a fixed axle shaft means, whereby the driving first and second drive gears rotate around the fixed gears thereby rotating the first and second drive motors which rotate the first and second driven wheels.

17. The method of operating a remote controlled powered wheelchair according to claim 16 wherein the steps of transmitting and receiving signals are accomplished by radio frequencies.

* * * * *